United States Patent
Mielke et al.

(10) Patent No.: US 7,322,548 B2
(45) Date of Patent: Jan. 29, 2008

(54) SUSPENSION FOR ELONGATED OBJECTS, IN PARTICULAR CABLES

(75) Inventors: Karl-Heinz Mielke, Eschweiler (DE); Karin Wimmer, Bad Nauheim (DE); Klaus Zoltner, Aschaffenburg (DE); Michael Schmidt, Fernwald (DE)

(73) Assignee: Newfrey LLC, Newark, DE (US)

( * ) Notice: Subject to any disclaimer, the term of this patent is extended or adjusted under 35 U.S.C. 154(b) by 316 days.

(21) Appl. No.: 10/963,417

(22) Filed: Oct. 12, 2004

(65) Prior Publication Data

US 2005/0116124 A1   Jun. 2, 2005

(30) Foreign Application Priority Data

Oct. 17, 2003   (DE) .................. 103 49 046

(51) Int. Cl.
*F16L 3/08*   (2006.01)
(52) U.S. Cl. ................... 248/74.3; 248/68.1; 24/16 PB
(58) Field of Classification Search .............. 248/74.3, 248/74.1, 68.1; 24/16 PB
See application file for complete search history.

(56) References Cited

U.S. PATENT DOCUMENTS

| | | | | |
|---|---|---|---|---|
| 2,632,217 A | * | 3/1953 | Flora ................. | 24/16 PB |
| 3,149,808 A | * | 9/1964 | Weckesser ............. | 248/74.3 |
| 3,672,615 A | * | 6/1972 | Fiorentino ............ | 248/74.3 |
| 4,447,934 A | * | 5/1984 | Anscher ............... | 24/16 PB |
| 4,524,937 A | * | 6/1985 | Zizan ................. | 248/74.3 |
| 5,112,013 A | | 5/1992 | Tolbert et al. | |
| 5,224,244 A | | 7/1993 | Ikeda et al. | |
| 5,752,682 A | | 5/1998 | Anderson | |
| 5,759,004 A | | 6/1998 | Kuffel | |
| 6,105,908 A | | 8/2000 | Kraus | |
| 6,981,683 B2 | * | 1/2006 | Winton, III ........... | 248/505 |
| 7,152,832 B2 | * | 12/2006 | Wochnick ............. | 248/74.3 |

FOREIGN PATENT DOCUMENTS

| | | | |
|---|---|---|---|
| DE | 3933305 | | 4/1991 |
| DE | 19540418 | | 5/1997 |
| DE | 19746424 | | 4/1999 |
| DE | 29823136 | | 5/1999 |
| EP | 0602548 | | 6/1994 |
| EP | 1524463 A1 | * | 4/2005 |
| FR | 2199362 | | 4/1974 |
| FR | 2771783 | | 6/1999 |
| GB | 1250057 | | 10/1971 |
| JP | 8178133 | | 7/1996 |
| JP | 09-159061 | | 6/1997 |
| JP | 2000-209750 | | 7/2000 |

\* cited by examiner

*Primary Examiner*—Anita M. King
(74) *Attorney, Agent, or Firm*—Harness, Dickey & Pierce, P.L.C.

(57) ABSTRACT

In a suspension for elongated objects, in particular cables (22) or the like, having a tension band (1) formable into a ring encircling the object and held together by a closure, and having a holder (30) separate from the tension band (1) for attachment of the tension band (1) to a support, the holder (30) comprises a finger (37) one end (39) of which overreaches the tension band (1) on the inside facing the cable (22). The end (39) of the finger (37) is opposed to an area of the holder (30) having a spring element (44) in contact with the outside of the tension band (1). A lock (42) secures the finger (37) in its position of engagement. After installation of the tension band (1), the holder (30) may be attached to the tension band (1) in a plurality of locations.

15 Claims, 3 Drawing Sheets

SUSPENSION FOR ELONGATED OBJECTS, IN PARTICULAR CABLES

CROSS-REFERENCE TO RELATED APPLICATIONS

This application claims the benefit of German Patent Application No. 103 49 046.9, filed Oct. 17, 2003. The disclosure of the above application is incorporated herein by reference.

FIELD OF THE INVENTION

The invention relates to a suspension for elongated objects, in particular cables or the like, having a tension band formable into a ring looped around the object and held together by a closure, and having a holder separate from the tension band for attaching the band to a support.

BACKGROUND OF THE INVENTION

Suspensions of the kind specified are suitable chiefly for attaching cable trees in vehicles. Today's vehicles contain numerous electrical components. These components must be supplied with electrical energy, and many of these components have interrelated functions and must therefore be connected to each other. For these reasons, extensive electric cablings are required in vehicles, combined in cable trees and then installed in the vehicles as independent components. Here it is important that the cable trees should be oriented and securely held as prescribed. Besides, the operation of installation should be performed as quickly and simply as possible.

A suspension disclosed in JP 09-159061 for attaching a cable tree consists of a tension band having a lock arranged at one end of the band, into which the other end of the band is insertable and securable in any tension position. A holding eye with locking fingers is likewise arranged on the tension lock, placeable on a threaded stud present at the place of installation. If this known suspension is to be employed in producing prefabricated cable trees, then there is the problem that the suspension must be arranged in an exactly defined angular position on the cable tree, since a subsequent rotation of the suspension into the correct position of installation relative to the cable tree is no longer feasible, or only with difficulty. Besides, after arrangement of the suspension on the cable tree, the holding eye projects from it. This is an impediment both to production of the cable tree and to installation of the cable tree, especially when the latter must moreover be thrust through openings in the bodywork.

U.S. Pat. No. 5,112,013 discloses a suspension of the kind specified in which the holder and tension band are separate from each other. For connecting the two parts to each other, the tension band comprises a shoe extending transverse to its lengthwise direction, insertable into an undercut groove formed on the holder, and slidable lengthwise in said groove to compensate tolerances. The holder is provided with a plug insertable in a hole in a supporting part. Before mounting of the cable tree on the supporting part, the holder is placed on the shoe of the tension band and oriented to fit the hole in axial direction. Then the installation is accomplished by pressing the plug into the hole in the support part. In the case of this suspension also, there is the problem that the tension band, when arranged on the cable tree, must be brought into a well-defined position of angular rotation, since after its installation, the tension band can no longer be shifted relative to the cable tree.

SUMMARY OF THE INVENTION

The object of the invention is to create a suspension of the kind initially mentioned that makes possible a simple arrangement of the suspension on an elongated object and a simple attachment of the elongated object to a support provided for the purpose.

This object, in the case of a suspension of the specified kind according to the invention, is accomplished in that the tension band and the holder, at numerous points of attachment located along the tension band, are connectable to each other by connecting means configured on the holder and/or the tension band.

With the invention, a suspension of the specified kind has been created in which the holder can be connected to the tension band at a plurality of attachment locations, so that for each situation of installation, a suitable attachment location is available. Consequently, no prior orientation of the tension band in circumferential direction is required in the fastening of the tension band to the cable. After installation of the tension band, the holder may either be connected first to the tension band and then to the support, or first to the support and then to the tension band, so that, according to the application, simple possibilities of installation for a cable tree around which the tension band is looped are available. The tension band according to the invention is producible in especially economical manner, as it is not provided with expensive holding means. Tension bands unwound from a roll and cut to length may also be connected to each other to produce the suspension according to the invention. This last is especially advantageous for automatic installation of the tension band.

An advantageous embodiment of the invention provides that the holder shall comprise at least one finger partly or completely overlapping one end of the tension band on the inside, facing the elongated object. The end of the finger may be opposed to an area of the holder forming a purchase for the outside of the tension band. This conformation has the advantage that conventional tension bands may be used. The clearance required for the finger between tension band and slung object in this embodiment may be produced by a loose installation of the tension band on the object, the tension band requiring as a rule to be tightened after attachment of the holder.

Another advantageous embodiment of the invention provides that the tension band, at short regular intervals on its inside, shall have recesses extending transverse to the lengthwise direction of the tension band, dimensioned of such size that after an object has been firmly looped, they form an opening to accommodate the end of the finger of the holder. In that case, the tension band may be firmly secured to the cable or like object immediately at installation.

According to another proposal of the invention, the holder comprises two fingers arranged as mirror images of each other on either side of a support area and having bent finger ends overreaching the tension band from both sides on the inside. This conformation has the advantage that greater holding forces and in particular greater bending moments can be transmitted at the point of connection between holder and tension band. Besides, the tension band can be connected to the holder by a motion directed transverse to the lengthwise extent of the slung object. To facilitate such an assembly operation, provision can be made so that the bent ends of the fingers have end surfaces so inclined that the distance between the end surfaces increases with increasing distance of the end surfaces from the support area. Alternatively or additionally thereto, provision may be made for the tension band to have a trapezoidal cross-section whose wider parallel side is located on the inside of the tension band. By the conformation of the end surfaces of the finger ends and/or the cross-sectional shape of the tension band as described, the finger ends are spread apart when the tension band is pressed against the holder, so that they slip away over the side surfaces of the tension band and finally embrace the tension band on the inside.

The clearance required for engagement of the finger ends of the holder may alternatively be created, according to a further proposal of the invention, in that the lengthwise side edges of the tension band have recesses extending along the tension band and facing the inside thereof. The recess may be formed by a preferably rectangular stepping of the side edges of the tension band. If only a small holding force is required, the clearance for engagement of the finger ends may be created by a trapezoidal cross-section of the tension band, the shorter parallel side of the cross-section being located on the inside of the tension band.

A further proposal of the invention provides that the support area of the holder facing the tension band shall comprise a spring element wound up by the tension band when it is fastened to the holder. In this way, a connection kept free from play by spring tension is achieved between the tension band and the holder.

In another advantageous embodiment of the invention, the tension band may have an undercut lengthwise groove on its outside, into which a T-shaped head of the holder is insertable from the outside and securable therein.

BRIEF DESCRIPTION OF THE DRAWINGS

The invention will be further illustrated below in terms of an embodiment represented in the drawings by way of example. In the drawings.

DETAILED DESCRIPTION

Figure 1:
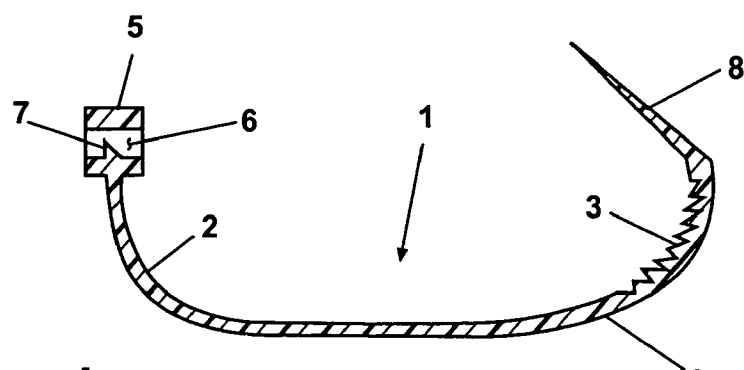
FIG. 1 is a cross sectional view of a tension band for a first embodiment of a suspension according to the invention.

FIG. 1 shows a tension band 1 of conventional conformation, suitable for formation of the suspension according to the invention. The tension band 1 consists of a flexible strip of rectangular cross-section, and is made of a tension-resistant, in particular synthetic, material. On its inner side 2 capable of being looped around the objects to be held, the tension band 1 comprises, at least over a portion of its length, a saw-like toothing 3. The outside 4 of the tension band 1 is smooth. At its one end, the tension band 1 comprises a lock 5 having an opening 6. In the opening 6, a locking tooth 7 is arranged. The opposed end 8 of the tension band 1 is tapered to a point to facilitate insertion in the lock 5.

For attachment to a cable, for example, the tension band 1 is placed around the cable, and then the end 8 is passed through the opening 6 of the lock 5. By the end 8 protruding from the opening 6, the tension band end 1 is then drawn through the lock 5 until it closes tight on the cable. In the course of tension, the locking tooth 7 skips teeth of the toothing 3 moving past it. In the opposed direction, the locking tooth 7 engages the toothing 3 and thereby holds the tension band 1 firmly in the tension position attained in the lock 5.

Figure 2:
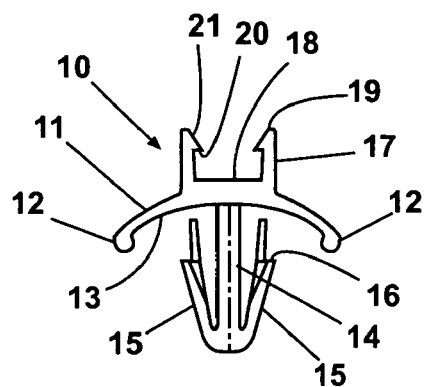
FIG. 2 is a front view of a holder for the suspension.
Figure 3:
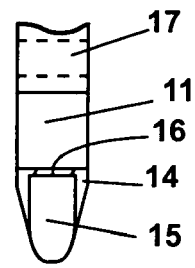
FIG. 3 is a side view of the holder according to FIG. 2.

FIGS. 2 and 3 show a holder 10 intended for attachment of the tension band 1 to a platform support. The holder 10 comprises a rectangular flange 11, curved in lengthwise direction, with bulging ribs 12 at its narrow ends, overreaching the concave surface of curvature 13 of the flange 11. In the middle of the surface of curvature 13, there is a pin 14 perpendicular thereto, at whose free-standing end two spring locking fingers 15 are arranged, extending in mirror image arrangement on either side of the pin 14 towards the surface of curvature 13. The locking fingers 15 are each provided with a step on their outside, forming a locking surface 16 facing the flange 11.

On its convexly curved side, the flange 11 comprises two fingers 17 projecting from it, arranged on either side of the center of the flange, arranged parallel and in mirror image to each other, and having the same width as the flange 11. Between the fingers 17, there is a plane contact surface 18. At the level of the contact surface 18, the fingers 17 are at a distance from each other about matching the width of the tension band 1 to be held. The fingers 17 have rectangularly bent ends 19 of sawtooth-like conformation and forming holding surfaces 20 facing the contact surface 18. The mutually opposed end surfaces 21 of the finger ends 19 are inclined to each other, the distance between the end surfaces 21 increasing with increasing distance from the contact surface 18.

Figure 4:
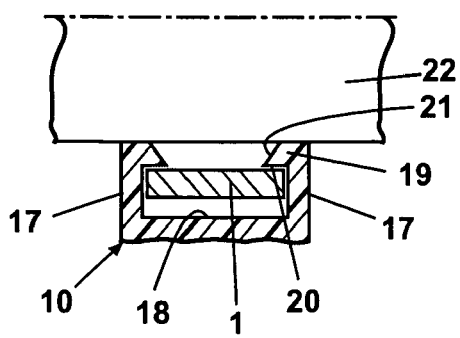
FIG. 4 is a cross-sectional view of the connection between the holder and tension band of the first embodiment of a suspension according to the invention.
Figure 5:
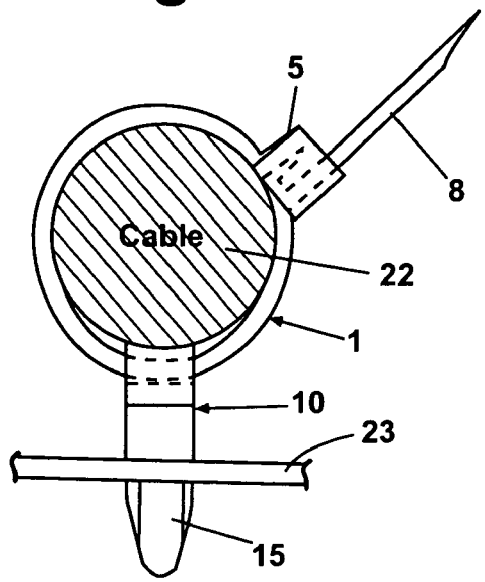
FIG. 5 is a partial cross sectional view showing the attachment of a cable tree to a plate by means of the first embodiment of a suspension according to the invention.

In FIGS. 4 and 5, it is shown how a cable 22 is attached to a platform support 23 by means of the suspension described. The tension band 1 is passed around the cable 22 in an independent assembly operation and closed to form a ring loosely encircling the cable 22. The holder 10 may either be attached first to the installed tension band 1 and then to the support 23, or first to the support 23 and then to the tension band 1. For connection of the holder 10 to the tension band 1, the fingers 17 of the holder 10 are so applied to the tension band 1 that the outer lengthwise edges of the tension band 1 touch the end surfaces 21 of the finger ends 19. Then holder 10 and tension band 1 are pressed towards each other, the tension band 1 slipping off over the end surfaces 21, thus pressing the finger ends 19 far enough apart that it can get through between them into the interval between fingers 17. As soon as the tension band 1 is located in the interval between fingers 17, the latter spring back into their initial position, and their ends 19 overreach the tension band 1 on the inside. With their holding surfaces 20, the finger ends 19 hold the tension band 1 firmly to the holder 10 in the position attained.

For attachment to the support 23, the holder 10 with locking fingers 15 is placed into an assembly opening provided in the support 23. The assembly opening is dimensioned of such size that the locking fingers 15 are pressed together when the holder 10 is inserted. The holder 10 is pressed into the assembly opening so deep that the ribs 12 of the flange 11 come into firm contact with the support 23, and the locking surfaces 16 of the locking fingers 15 emerge from the assembly opening at the back of the support 23, springing back all the way or part way into their original position. The locking surfaces 16 are thereby brought into engagement with the back of the support 23, holding the holder 10 firmly in the assembly opening. In this assembly operation, the flange 11 is likewise elastically deformed in the manner of a leaf spring by being pressed into contact with the support 23, and thereby effects a tight interlocking between the holder 10 and the support 23.

By the assembly operations described, the cable 22, as shown in FIG. 5, is connected to the support 23. While the tension band 1 at first was merely passed loosely around the cable 22 to create enough clearance for engagement of the finger ends 19 between the tension band 1 and the cable 22, after assembly of the holder 10 the tension band 1 can be tightened by pulling at the end 8, thus achieving a sufficiently firm connection among the cable 22, the tension band 1 and the holder 10.

Figure 6:
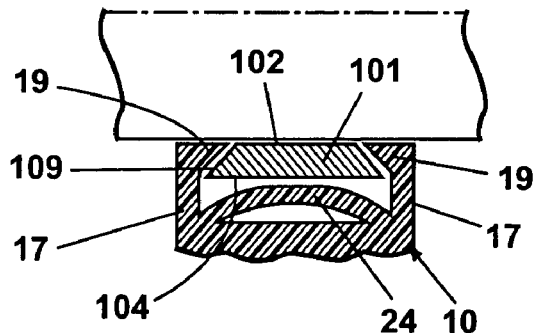
FIG. 6 is a partial cross sectional view showing the fastening location of a second embodiment of a suspension according to the invention.

In the embodiment shown by way of example in FIG. 6, the tension band 101 has a trapezoidal cross-section, the shorter parallel side of the trapezoidal cross-section being located on the inside 102 of the tension band 101. The side surfaces 109 of the tension band 101 each form an angle of about 135° with the inside 102. By this cross-sectional shape of the tension band 101, an undercut is produced on the side surfaces 109, serving for engagement of correspondingly shaped ends 19 of the fingers 17 of the holder 10.

In the embodiment shown by way of example in FIG. 6, the holder 10 in the interval between the fingers 17 comprises a spring element 24 in the form of a bowed leaf spring, abutting on the outside 104 of the tension band 101 and, in the installed position, bracing the tension band 101 firmly against the holder 10.

Figure 7:
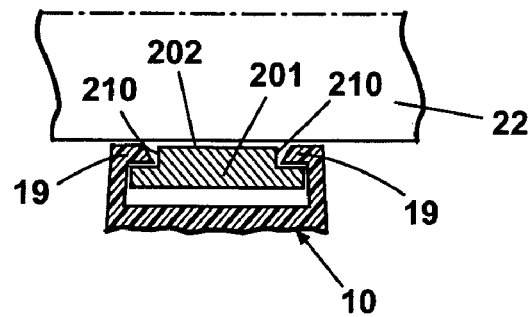
FIG. 7 is a partial cross sectional view showing the fastening location of a third embodiment of a suspension according to the invention.

In the embodiment shown by way of example in FIG. 7, the holder 10 is combined with a tension band 201 having a recess 210 extending along the tension band 201 on the inside 202 of each of its lateral lengthwise edges, which recess is formed by a rectangular step in the lateral edges of the tension band 201. The two recesses 210 are dimensioned wide and high enough so that the rectangularly bent finger ends 19 of the holder 10 have room therein. In this way the recesses 210 remain accessible to the finger ends 19 even when the tension band 201 is tensed firmly around the cable 22 to be held. The tension band 201 therefore need not be loose for attachment of the holder 10. The same applies to the tension band 101 in FIG. 6.

Figure 8:
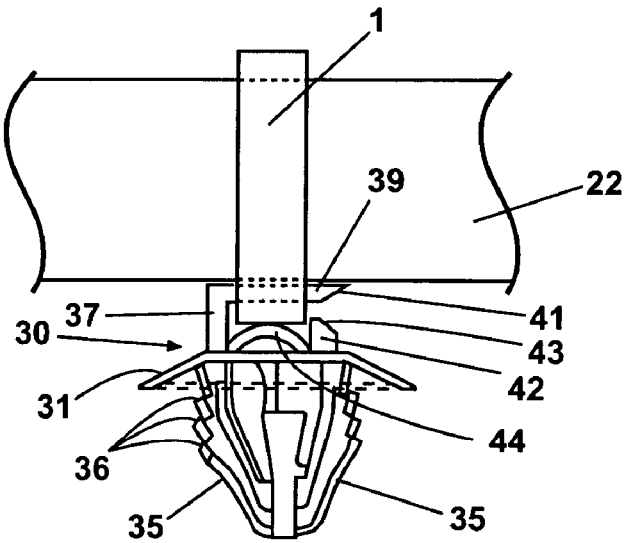
FIG. 8 is a front view of the arrangement of a fourth embodiment of a suspension according to the invention on a cable.

FIG. 8 shows a holder 30 having a dished flange 31 and a plurality of locking fingers 35, each having three locking surfaces 36 and serving to anchor the holder 30 in a hole in a support. On the side away from the locking fingers 35, a finger 37 projecting therefrom is attached to the flange 31, with a rectangularly bent finger end 39 extending substantially parallel to the flange 31. The finger end 39 is provided with an oblique end surface 41 intended to facilitate insertion of the finger end 39 in the interval between a cable 22 and a tension band 1 encircling the same. Between the end portion of the finger end 39 and the flange 31, there is a cam 42 on the flange 31, having an end surface 43 inclined oppositely to the end surface 41. The distance of the cam 42 from the finger end 39 is smaller than the thickness of the tension band 1 cooperating with the holder 10. From the finger 37 the cam 42 has a distance equal to or greater than the width of the tension band 1. Between the finger 37 and the cam 42, there is also a spring element 44 configured as a leaf spring.

As may be seen in FIG. 8, the holder 30 with finger end 39 is inserted in an interval left clear between the inside of the tension band 1 and the cable 22, the tension band 1 slipping off over the cam 42 with elastic deformation of the finger end 39. In the final position of installation shown, the finger end 39 reaches through the tension band 1 on the inside, being secured against loosening spontaneously by the lateral cam 42 in contact with the tension band 1. Besides, the holder 30 is supported by the spring element 44 on the outside of the tension band 1.

Since the finger end 39 overreaches the tension band 1 completely, the attachment of the holder 30, with the configuration of the tension band 1 as shown in FIG. 1, is possible only if the tension band 1 does not yet enclose the cable 22 firmly. After attachment of the holder 30, the tension band 1 can be tensed firmly on the cable 22.

Figure 9:
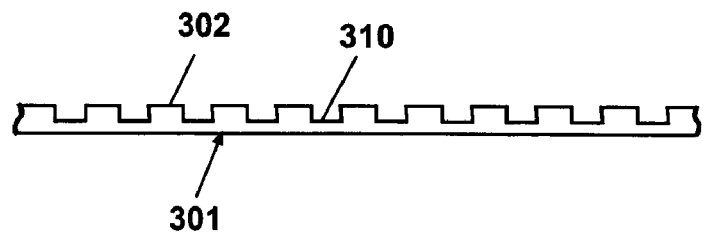
FIG. 9 is a side elevational view of a segment of another embodiment of a tension band for a suspension according to the invention.

FIG. 9 shows an embodiment of a tension band 301 capable of being tensed firmly around the cable even before installation of the holder 30. On its inside 302, the tension band 301 comprises recesses 310 extending transversely over the width of the tension band 301 at regular intervals on the inside 302 thereof, their cross-sectional dimensions being of such size that they form an opening sufficiently large for insertion or passage of the finger end 39, even after winding around a cable. Since the spacing of the recesses 310 can be quite close, in this embodiment of the tension band also a sufficiently large number of fastening locations can be realized for a suitably oriented attachment of the holder in each instance.

Figure 10:
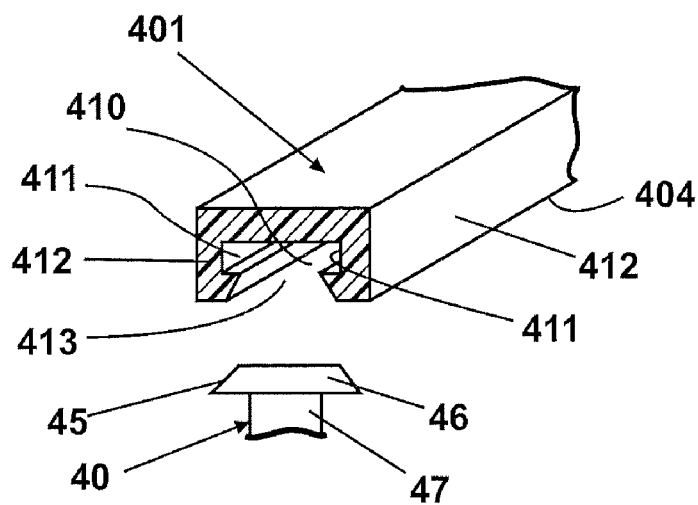
FIG. 10 is a partially cross sectional perspective view of a suspension having a grooved tension band.

FIG. 10 shows an example of a suspension having a tension band 401 with a longitudinal groove 410 on its outside 404. The longitudinal groove 410 is provided with an undercut formed by recesses 411 of rectangular cross-section in the side walls 412 of the longitudinal groove 410. The longitudinal groove 410 comprises an entrance opening 413 having a cross-sectional shape flared outward.

The tension band 401 is attached by means of a holder 40 having a T-shaped head 45, consisting of a head plate 46 and a shank 47. The head plate 46 is in the shape of a flat truncated cone tapering down to the end of the head 45, its greatest diameter matching the width of the longitudinal groove 410 in the tension band 401 near the undercut. The thickness of the head plate 46 is equal to or less than the width of the recesses 411.

Instead of a round shape, the head plate 46 may alternatively have a polygonal shape, for example rectangular or square, where the dimension in one direction must not be greater than the width of the undercut of the longitudinal groove 410.

To connect the tension band 401 to the holder 40, the head 45 is pressed, head plate 46 first, through the entrance opening 413 in the undercut of the longitudinal groove 410 in the tension band 401. In this operation, the side walls 412 of the head plate 46 are temporarily bent apart. As soon as the head plate 46 has passed the entrance opening 413, the side walls 412 spring back into their initial position, the head plates 46 engaging the recesses 411 and being thereby held firmly in the longitudinal groove 410.

Figure 11:
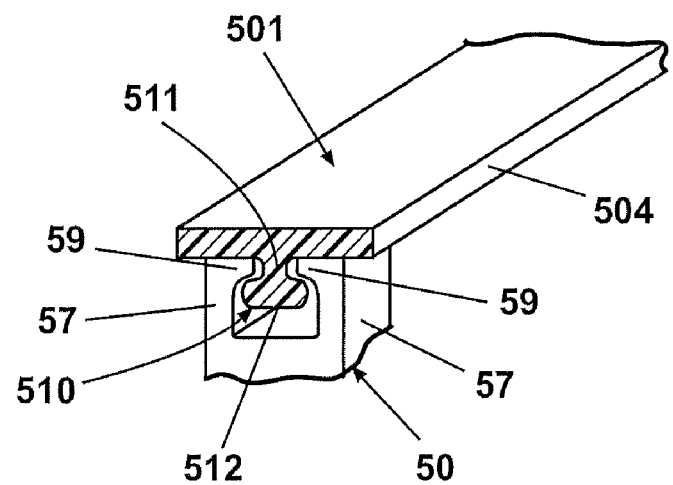
FIG. 11 is a partially cross sectional perspective view of a suspension having a tension band with a fastening rib.

In the case of the suspension shown in FIG. 11, the tension band 501 has, on its outside 504, a lengthwise rib 510 consisting of a web 511 extending outward from the outside 504 and a head bead 512 adjoining the outer end of the web 511, extending transverse to the web 511 and projecting bilaterally beyond the web 511. The holder 50 intended for attachment of the tension band 501 is provided, much like the holder 10 shown in FIG. 2, with two fingers 57 capable of being bent apart elastically and having bent finger ends 59 directed towards each other. Upon being pressed into contact with the tension band 501, the finger ends 59 slip off over the head bead 512 and underreach the head bead 512 on either side of the web 511.

The holders described in this Application may, in modification of the embodiments described, may alternatively have other means for their attachment to the support 22. For example, the holders may be provided with clamps or loops fastenable to suitable projections on the support. Also, the conformation of the suspension according to the invention allows an embodiment of the holders in which these are first connected to the support by bonding or welding. In the case of the holder 40 shown in FIG. 10, this may be a metal welding pin welded to a metallic support.

What is claimed is:

1. A suspension for elongated objects, comprising:
   a band flexibly conformable about the objects;
   a closure operable to hold together the band about the objects; and
   a holder separate from the band for attachment of the band to a support, the holder having a flange with a finger and a spring member extending from the flange;
   wherein the band and the holder are connectable to each other at a plurality of attachment locations located along the band having the band positioned between the finger and the spring member, the spring member operable to bias against and retain the band positioned adjacent at least one of the attachment locations.

2. The suspension of claim 1, further comprising an inside surface of the band facing the elongated object;
   wherein the finger further includes a finger end distally including an oblique end surface; and
   wherein the finger end is insertable between the band and the objects with the oblique end surface positionable to overreach a segment of the band.

3. The suspension of claim 2, wherein the holder further comprises a cam, the cam opposing the oblique end surface of the finger and operable to form a lateral purchase of the band.

4. The suspension of claim 1, wherein the band further comprises a tension band including a flexible strip material.

5. The suspension of claim 1, wherein the band comprises a synthetic material.

6. The suspension of claim 1, wherein the holder further includes opposed locking fingers engageable with the support, the support defining a platform support of a vehicle.

7. A joining system, comprising:
   an elongated object;
   a flexible band conformable about the object;
   a lock connected to a first end of the flexible band, the lock sized to receive the flexible band; and
   a holder separate from the band, the holder including:
      a flange;
      a finger connected to the flange, the finger having a deflectable finger end angularly oriented with respect to the finger and freely extending from the finger; and
      a cam connected to the flange and positioned opposite the finger end, the band receivable between the finger end and the cam by deflection of the finger end;
   wherein the band and the holder are connectable to each other at a plurality of attachment locations located along the band with the band received between the finger and the cam to retain the band.

8. The system of claim 7, wherein the elongated object comprises a cable.

9. The system of claim 7, wherein the elongated object comprises a cable tree.

10. A suspension for elongated objects, comprising:
    a band flexibly conformable about the objects, the band including a closure operable to grasp a free end of the band when the band is conformed about the objects; and
    a holder separate from the band for attachment of the band to a support, the holder including:
       a flange;
       a deflectable member having a finger connected to the flange and a finger end freely and angularly extending from the finger; and
       a spring element connected to the flange and positioned between the flange and the deflectable member;
    wherein the band and the holder are connectable to each other at a plurality of attachment locations located along the band having the finger end insertable between the objects and the band, the spring element operable to contact the band with the band positioned between the spring element and the finger end.

11. The suspension of claim 10, wherein the finger end includes an oblique end surface operable to assist insertion of the finger end between the objects and the band.

12. The suspension of claim 11, further comprising a cam connected to the flange, the spring element being positioned between the finger and the cam, the cam adapted to resist removal of the band.

13. The suspension of claim 12, wherein the cam includes an end surface inclined opposedly to the oblique end surface of the finger end.

14. The suspension of claim 10, wherein the finger end is oriented parallel to the flange.

15. The suspension of claim 10, wherein the spring element comprises a leaf spring.

* * * * *